United States Patent
Lin et al.

(10) Patent No.: US 9,084,094 B2
(45) Date of Patent: Jul. 14, 2015

(54) METHOD AND DEVICE FOR GROUP-TRANSMITTING MULTIMEDIA MESSAGES

(75) Inventors: Zhihui Lin, Shenzhen (CN); Qi Qiao, Shenzhen (CN); Yi Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 150 days.

(21) Appl. No.: 13/988,098

(22) PCT Filed: Mar. 17, 2011

(86) PCT No.: PCT/CN2011/071941
§ 371 (c)(1),
(2), (4) Date: May 17, 2013

(87) PCT Pub. No.: WO2012/065394
PCT Pub. Date: May 24, 2012

(65) Prior Publication Data
US 2013/0235787 A1    Sep. 12, 2013

(30) Foreign Application Priority Data

Nov. 19, 2010    (CN) .......................... 2010 1 0552401

(51) Int. Cl.
*H04H 20/71*    (2008.01)
*H04W 4/12*    (2009.01)
(Continued)

(52) U.S. Cl.
CPC ............... *H04W 4/12* (2013.01); *H04L 12/189* (2013.01); *H04L 12/28* (2013.01); *H04L 12/56* (2013.01);
(Continued)

(58) Field of Classification Search
CPC ....................................................... H04W 4/12
USPC .......... 370/312, 328–339, 401–466; 455/414, 455/426
See application file for complete search history.

(56) References Cited

U.S. PATENT DOCUMENTS

| | | | |
|---|---|---|---|
| 2005/0195856 A1* | 9/2005 | Jun ............................... | 370/467 |
| 2009/0209202 A1* | 8/2009 | Martini et al. ............... | 455/41.2 |
| 2010/0279668 A1* | 11/2010 | Cao ............................ | 455/414.1 |

FOREIGN PATENT DOCUMENTS

| | | |
|---|---|---|
| CN | 101588345 A | 11/2009 |
| CN | 101594578 A | 12/2009 |
| CN | 101867897 A | 10/2010 |

OTHER PUBLICATIONS

International Search Report (Form PCT/ISA/210) for PCT/CN2011/071941, mailed Aug. 25, 2011.

*Primary Examiner* — Iqbal Zaidi
(74) *Attorney, Agent, or Firm* — Koppel, Patrick, Heybl & Philpott

(57) ABSTRACT

The present disclosure discloses a method for group-transmitting multimedia messages. The method comprises the following steps: setting addresses of reception parties at a transmission terminal; after a multimedia message is edited by a user, the transmission terminal establishing a connection via Wireless Fidelity (WIFI) with reception terminals according to the addresses of the reception parties, and transmitting the multimedia message to the reception terminals via the established connection according to the addresses of the reception parties. The present disclosure further discloses a device for group-transmitting multimedia messages. The method and the device of the present disclosure realize the group-transmission of multimedia messages without limiting the size of the multimedia messages, thus profiting the development and popularization of the multimedia message service.

8 Claims, 1 Drawing Sheet

(51) Int. Cl.
*H04L 12/28* (2006.01)
*H04L 12/54* (2013.01)
*H04W 4/06* (2009.01)
*H04L 29/06* (2006.01)
*H04L 12/58* (2006.01)
*H04L 12/18* (2006.01)
*H04W 76/00* (2009.01)
*H04W 84/12* (2009.01)

(52) U.S. Cl.
CPC ............... *H04L 51/10* (2013.01); *H04L 51/38* (2013.01); *H04L 65/4076* (2013.01); *H04W 4/06* (2013.01); *H04W 76/002* (2013.01); *H04W 84/12* (2013.01)

METHOD AND DEVICE FOR GROUP-TRANSMITTING MULTIMEDIA MESSAGES

FIELD OF THE INVENTION

The present disclosure relates to the multimedia service transmitting field, and more especially to a method and a device for group-transmitting multimedia messages.

BACKGROUND OF THE INVENTION

With the development of the Third Generation (3G) mobile communication technology and the increase of network bandwidth, Packet Switched (PS) service, namely data service, whose application in mobile phones is increasingly widely. Users can obtain more information through the PS service and get excellent user experience from it. In the PS service, Multimedia Messaging Service (MMS), namely multimedia messages, is a kind of service frequently used by users. Users can concatenate audio, video, texts, pictures, etc. that are not associated with each other into a multimedia message in the format of Synchronized Multimedia Integration Language (SMIL) through editing and transmit the multimedia message, and the multimedia message shows itself in the form of similar to film screening when reception parties read the multimedia message, which can enhance the associativity of media data greatly, increase the amount of information and improve user experience. At present, the popular mobile phone news is sent in the form of multimedia messages. Besides, multimedia messages can also be used to make various publicity advertisements and electronic magazines, etc.

However, the present multimedia message service has the following disadvantages: firstly, multimedia messages can only be sent via operators' networks, while the operators charge great expenses for a multimedia message, which increases use cost of users; secondly, the maximum number of the addressees of a present multimedia message is 20, so large batch & multi-user transmission can not be realized; if a user wants to transmit a multimedia message to a group, he/she has to conduct the operation for many times; thirdly, the size of a multimedia message is restricted by network all the time, and the maximum capacity of a multimedia message is 300K, far from meeting users' demand; if users would like to edit a multimedia message of a very large capacity and share it with others, now only infrared and Bluetooth are available, but the two can only be used to realize terminal-to-terminal transmission rather than multi-user reception. Moreover, both methods are restricted by distance, which means that once the distance is beyond the coverage area of infrared and Bluetooth, the multimedia message can not be received.

SUMMARY OF THE INVENTION

In the view of this, the present disclosure provides a method and a device for group-transmitting multimedia messages, which can realize the group-transmission of multimedia messages without limiting the size of the multimedia messages but lowering the cost, thus profiting the development and popularization of the multimedia message service.

The present disclosure adopts the following technical solution.

The present disclosure provides a method for group-transmitting multimedia messages, comprising: setting addresses of reception parties at a transmission terminal; after a multimedia message is edited by a user, the transmission terminal establishing a connection via Wireless Fidelity (WIFI) with reception terminals according to the addresses of the reception parties, and transmitting the multimedia message to the reception terminals via the established connection according to the addresses of the reception parties.

In the solution above, setting addresses of reception parties comprises: setting address of a single reception terminal in Local Area Network, or setting the addresses of multiple reception terminals in the Local Area Network.

In the solution above, after a multimedia message is edited by a user, the method further comprises: the user editing the multimedia message with the multimedia message module of the transmission terminal and selecting the WIFI to transmit the multimedia message; or selecting an existing multimedia message and forwarding the existing multimedia message via WIFI; wherein the multimedia message module cancelling the limitation to the size of multimedia messages.

In the solution above, the transmission terminal establishing the connection via the WIFI with the reception terminals according to the addresses of the reception parties comprises: the transmission terminal opening the WIFI, searching hot spots and establishing a connection with the hot spots; the transmission terminal reading the stored addresses of the reception parties, and notifying the reception terminals to open the WIFI and establish a connection with the hot spots, or the reception terminals opening the WIFI directly and establishing a connection with the hot spots; and the transmission terminal establishing the connection with the reception terminals according to the addresses of the reception parities and Transmission Control Protocol/Internet Protocol (TCP/IP).

In the solution above, after transmitting the multimedia message to the reception terminals, the method further comprises: after determining the reception of the multimedia message is finished, the reception terminal notifying the transmission terminal and disconnecting itself from the hot spots; and the transmission terminal determining the transmission of the multimedia message is finished according to the notification from the reception terminals, prompting the user and disconnecting itself from the hot spots.

The present disclosure also provides a device for group-transmitting multimedia messages, the device comprises: a setting module, a multimedia message module, a WIFI connection management module and a multimedia message transmission module; wherein the setting module, configured to provide an interface for setting addresses of reception parties to a user and store the set addresses of the reception parties; the multimedia message module, configured to notify the WIFI connection management module after the user transmitting an edited multimedia message or an existing multimedia message via WIFI; the WIFI connection management module, configured to read the addresses of the reception parties in the setting module according to the notification from the multimedia message module, establish a connection with the reception terminals according to the addresses of the reception parties and notify the multimedia message transmission module; and the multimedia message transmission module, configured to read the multimedia message in the outbox and the addresses of the reception parties in the setting module according to the notification from the WIFI connection management module, and transmit the multimedia message to the reception terminals according to the addresses of the reception parties.

In the solution above, the multimedia message module is further configured to provide a multimedia message editing or forwarding interface to the users and cancel the limitation to the size of multimedia messages.

In the solution above, part of the WIFI connection management module which is at the transmission terminal is configured to open the WIFI, search hot spots and establish a connection with the hot spots according to the notification from the multimedia message module; read the stored addresses of the reception parties, notify the reception terminals to open the WIFI and establish a connection with the reception terminals according to the addresses of the reception parties and TCP/IP; and part of the WIFI connection management module which is at the reception terminal is configured to open the WIFI, search hot spots and establish a connection with the hot spots according to the notification from the transmission terminal; or open the WIFI, search hot spots and establish a connection with the hot spots according to the user's choice.

In the solution above, the device further comprises: a multimedia message reception module, which is at the reception terminal, configured to determine the reception of the multimedia message is finished, notify the multimedia message transmission module of the transmission terminal and the WIFI connection management module at the reception terminal; and part of the WIFI connection management module, which is at the reception terminal, further configured to disconnect the reception terminal from the hot spots according to the notification from the multimedia message reception module.

In the solution above, the multimedia message transmission module is further configured to determine the transmission of the multimedia message is finished according to the notification from the reception terminal, prompt the user and notify the WIFI connection management module at the transmission terminal; and part of the WIFI connection management module, which is at the transmission terminal, is configured to disconnect the transmission terminal from the hot spots according to the notification from the multimedia message module.

From the above, we can see that, by adopting the method and the device of the present disclosure, multimedia messages can be transmitted via WIFI in stead of via operators' networks, which free users from paying money to the operators. Thus use cost can be significantly cut for users. Moreover, the setting of over 20 addresses of reception parties simultaneously is supported, enabling multimedia messages to be transmitted to more users, correspondingly, more users can receive multimedia messages simultaneously. Furthermore, the transmission of the multimedia messages in the present disclosure is not via the operators' networks, and the multimedia message module in terminal no longer imposes limitation to the size of multimedia messages. Therefore, the transmission of large-capacity multimedia messages can be realized, profiting the development and popularization of the multimedia message service.

DETAILED DESCRIPTION OF THE EMBODIMENTS

The basic concept of the present disclosure is: single or multiple addresses of reception parties are set at a transmission terminal and then stored; after a multimedia message is edited by a user, the transmission terminal establishes a connection via WIFI with reception terminals according to the addresses of the reception parties, and transmits the multimedia message to the reception terminals via the established connection according to the addresses of the reception parties, wherein the transmission terminal and the reception terminals are terminals which support WIFI.

Figure 1:
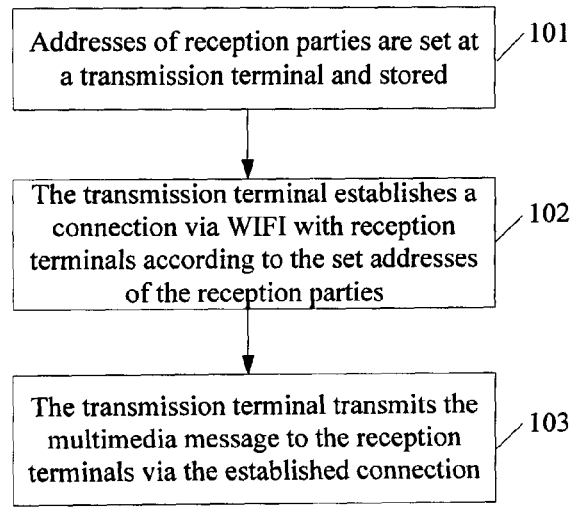
FIG. 1 is a schematic diagram of the procedure of the method for realizing multimedia messages group-transmitting according to the present disclosure.
Figure 2:
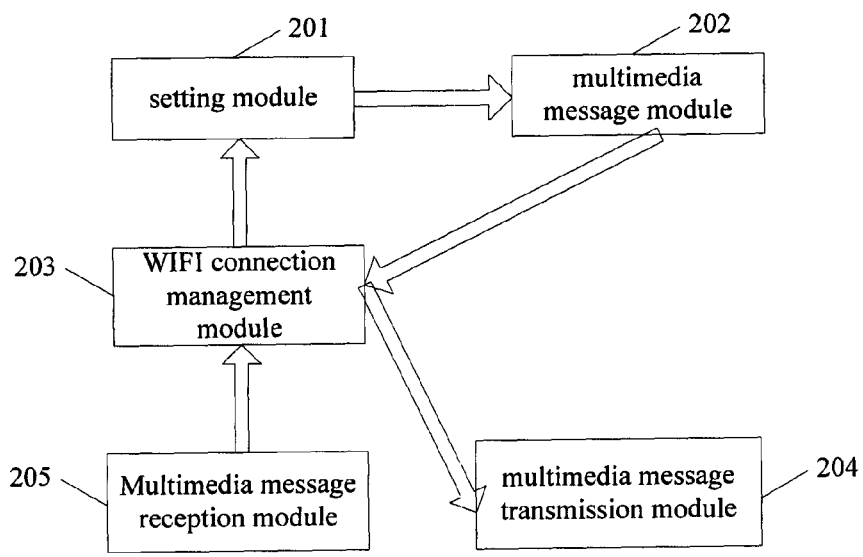
FIG. 2 is a schematic diagram of the composition of the device for realizing multimedia messages group-transmitting according to the present disclosure.

The present disclosure will be further illustrated hereinafter in conjunction with the embodiments and drawings. The method for group-transmitting multimedia messages according to the present disclosure is as shown in FIG. 1, wherein the specific steps are as follows.

Step 101, addresses of reception parties are set at a transmission terminal and then stored.

The addresses of the reception parties are set through the transmission terminal by a user, the addresses of the reception parties refer to the addresses of the reception parties in the Local Area Network (LAN), which include IP address and port number. The address of a single reception party can be set, and then multimedia messages will be transmitted to a single reception terminal; the addresses of multiple reception parties can be set via an address setting interface, and then multimedia messages will be transmitted to multiple reception terminals; the transmission terminal stores the addresses of the reception parties set by the user locally. Herein, when the addresses of multiple reception parties are set, the addresses of over 20 reception parties are allowed to be set.

Step 102, the transmission terminal establishes a connection via WIFI with the reception terminals according to the set addresses of the reception parties.

The user edits a multimedia message with the multimedia message module of the transmission terminal and then selects the WIFI to transmit the edited multimedia message, and the multimedia message module stores the multimedia message into the outbox; or selects an existing multimedia message in the multimedia message module and forwards the existing multimedia message via the WIFI, and the multimedia message module stores the multimedia message into the outbox.

In the present disclosure, since multimedia messages are not transmitted via operators' networks, the multimedia message module will not impose limitation to the size of multimedia messages.

In the above, the method that the transmission terminal establishes the connection via the WIFI with the reception terminals is specifically: the transmission terminal opens the WIFI and searches hot spots. If no hot spot capable of being connected is found, a prompt that the connection is unsuccessful will be given to the user; if hot spots capable of being connected are found, a connection with the hot spots will be established, and a prompt that the connection is successful will be given to the user.

At the same time, the transmission terminal reads the stored addresses of the reception parties and notifies the reception terminals to open the WIFI and establish a connection with the hot spots according to the addresses of the reception parties; or the users of the reception parties open the WIFI of the reception terminals directly so that the reception terminals establish a connection with the hot spots, and then the transmission terminal establishes a connection with the reception terminals according to the addresses of the reception parties and the network communication protocol TCP/IP. Herein, the hot spots refer to the access points that can have access to WIFI network; the method of notifying the reception terminals to open the WIFI includes: the transmission terminal transmits a connection establishing message to the reception terminals which open their WIFI after receiving the connection establishing message.

Step 103, the transmission terminal transmits the multimedia message to the reception terminals via the established connection.

Specifically, the transmission terminal reads the multimedia message in its outbox and the stored addresses of the reception parties, and transmits the multimedia message to the reception terminals via the established connection according to the addresses of the reception parties.

The reception terminals receive the multimedia message sent by the transmission terminal and notify the transmission terminal after determining the reception of the multimedia message has finished, and then disconnect the reception terminals from the hot spots. In the above, the process of determining the reception of the multimedia message has finished means: the reception terminals form the received multimedia message data into an integral multimedia message according to multimedia message protocol; the process of notifying the transmission terminal is: making a reply with a reception finishing message to the transmission terminal.

The transmission terminal gives a prompt that the transmission of the multimedia message has finished to the user after determining the transmission of the multimedia message has finished according to the notification from the reception terminals, stores the multimedia message from the outbox to the box for sent multimedia messages and disconnects the transmission terminal from the hot spots at the same time. In the above, the method of determining the transmission of the multimedia message has finished includes: the transmission terminal compares the number of the received reception finishing messages with the number of the stored addresses of the reception parties, if the result are the same, the transmission of the multimedia message has finished.

In the present disclosure, multimedia messages are sent via the connection established via WIFI instead of the operators' networks, freeing users from paying money to operators.

The present disclosure will be further illustrated hereinafter through a specific embodiment.

A user sets the addresses of the reception parties at a transmission terminal, for example, the port number of the addresses of a reception parties is 80 and the IP address is 192.168.10.1~192.168.10.100, then the transmission terminal can send the multimedia message to the 100 reception terminals corresponding to the IP above and the reception terminals can store the addresses set by the user.

The user edits a multimedia message with the multimedia message module of the transmission terminal, or selects an existing multimedia message for forwarding. Since the multimedia message is not transmitted via operators' networks, the size of the multimedia message can be much greater than 300K, for example 1M. The edited multimedia message or the one to be forwarded is selected WIFI to transmit, and the multimedia message module stores the multimedia message into the outbox. The transmission terminal opens the WIFI, searches and establishes a connection with hot spots, reads the stored addresses of the reception parties, notifies the reception terminals to open the WIFI and then establishes a connection with the reception terminals according to the addresses of the reception parties and TCP/IP protocols; or, the reception terminals open the WIFI directly and the transmission terminal establishes a connection with the reception terminals according to the addresses of the reception parties and TCP/IP protocols.

The transmission terminal reads the multimedia message in its outbox and the stored addresses of the reception parties, and transmits the multimedia message to the reception terminals via the established connection according to the addresses of the reception parties; the reception terminal receives the multimedia message and notifies the transmission terminal after determining the reception of the multimedia message has finished, and disconnects the reception terminal from the hot spots at the same time; the transmission terminal stores the multimedia message from the outbox to the box for sent multimedia messages after determining the transmission of the multimedia message has finished according to the notification from the reception terminals, gives a prompt that the transmission of the multimedia message has finished to the user and disconnect the transmission terminal from the hot spots at the same time.

To realize the method above, the present disclosure further provides a device for group-transmitting multimedia messages, the device includes: a setting module 201, a multimedia message module 202, a WIFI connection management module 203 and a multimedia message transmission module 204; wherein the setting module 201 is configured to provide an interface for setting the addresses of reception parties to a user and store the addresses of the reception parties set by the user; wherein the addresses of the reception parties refer to the IP address and port number in the LAN.

the multimedia message module 202 is configured to provide a multimedia message editing interface to the user, and notify the WIFI connection management module 203 and store the multimedia message into the outbox after the user transmits an edited multimedia message or an existing multimedia message via the WIFI; herein, the multimedia message module 202 cancels the limitation to the size of multimedia messages;

the WIFI connection management module 203 is configured to activate the WIFI, read the addresses of the reception parties stored in the setting module 201 according to the notification from the multimedia message module, establish a connection with the reception terminals according to the addresses of the reception parties and notify the multimedia message transmission module 204; wherein the connection with the reception terminal is established via TCP/IP protocol; and the multimedia message transmission module 204 is configured to read the multimedia message in the outbox and the addresses of the reception parties in the setting module 201 according to the notification from the WIFI connection management module 203, and transmit the multimedia message to the reception terminals according to the addresses of the reception parties.

In practical applications, the WIFI connection management module 203 includes two parts: one part is at the transmission terminal and the other part is at the reception terminal; wherein the part of the WIFI connection management module 203 at the transmission terminal is specifically configured to activate the WIFI, search hot spots and establish a connection with the hot spots if some hot spots are found, and then read the addresses of the reception parties in the setting module 201, notify the reception terminals to open the WIFI and establish a connection with the reception terminals according to the addresses of the reception parties and TCP/IP protocol; the notification is: transmitting a connection establishing message to the WIFI connection management module of the reception terminal; and the other part of the WIFI connection management module 203 at the reception terminal is specifically configured to open the WIFI according to the notification from the transmission terminal, search hot spots and establish a connection with the hot spots if some hot spots are found; or to open the WIFI according to the choice of a user, search hot spots and establish a connection with the hot spots if some hot spots are found.

The device further comprises a multimedia message reception module 205;

the multimedia message reception module 205, which is at the reception terminal, is configured to receive multimedia message data packet transmitted by the multimedia message transmission module 204 of the transmission terminal, notify the multimedia message transmission module 204 of the transmission terminal after determining the reception of the multimedia message has finished, and notify the WIFI connection management module 203 of the reception terminals at the same time; the determination method includes: the received multimedia message data packet is formed into an integral multimedia message according to the multimedia message protocol, so that the reception of the multimedia message is finished; notifying the multimedia message transmission module 204 of the transmission terminal includes: returning the reception finishing message to the multimedia transmission module 204 of the transmission terminal;

the part of the WIFI connection management module 203 at the reception terminal is further configured to disconnect the reception terminal from the hot spots.

The multimedia message transmission module 204 is further configured to determine the transmission of the multimedia message is finished, notify the WIFI connection management module 203 of the transmission terminal, store the multimedia message from the outbox to the box for sent multimedia messages at the same time and give the user a prompt that the transmission of the multimedia message is finished; the method of determining the transmission is finished includes: comparing the number of the received reception finishing messages with the number of the addresses of the reception parties stored in the setting module, if the result is the same, the transmission of the multimedia message is finished;

the part of the WIFI connection management module 203 at the transmission terminal is further configured to disconnect the transmission terminal from the hot spots according to the notification from the multimedia message transmission module 204.

The above is just the preferred embodiments of the present disclosure, but not intended to limit the protection scope of the present disclosure. Any modification, alternation and improvement within the spirit and the principles of the present disclosure shall be covered by the protection scope of the present disclosure.

What is claimed is:

1. A method for group-transmitting multimedia messages, comprising: setting addresses of reception parties at a transmission terminal; and further comprising:
    after a multimedia message is edited by a user, the transmission terminal establishing a connection via Wireless Fidelity (WIFI) with reception terminals according to the addresses of the reception parties, and transmitting the multimedia message to the reception terminals via the established connection according to the addresses of the reception parties;
    wherein the transmission terminal establishing the connection via the WIFI with the reception terminals according to the addresses of the reception parties comprises: the transmission terminal opening the WIFI, searching hot spots and establishing a connection with the hot spots; the transmission terminal reading the stored addresses of the reception parties, and notifying the reception terminals to open the WIFI and establish a connection with the hot spots, or the reception terminals opening the WIFI directly and establishing a connection with the hot spots; and the transmission terminal establishing the connection with the reception terminals according to the addresses of the reception parities and Transmission Control Protocol/Internet Protocol (TCP/IP);
    wherein after transmitting the multimedia message to the reception terminals, the method further comprises: after determining the reception of the multimedia message is finished, the reception terminal notifying the transmission terminal and disconnecting the reception terminal from the hot spots; and the transmission terminal determining the transmission of the multimedia message is finished according to the notification from the reception terminals, prompting the user and disconnecting the transmission terminal from the hot spots.

2. The method according to claim 1, wherein setting addresses of reception parties comprises:
    setting address of a single reception terminal in Local Area Network, or setting the addresses of multiple reception terminals in the Local Area Network.

3. The method according to claim 2, wherein after a multimedia message is edited by a user, the method further comprises:
    the user editing the multimedia message with the multimedia message module of the transmission terminal and selecting the WIFI to transmit the multimedia message; or selecting an existing multimedia message and forwarding the existing multimedia message via WIFI; wherein the multimedia message module cancelling the limitation to the size of multimedia messages.

4. The method according to claim 1, wherein after a multimedia message is edited by a user, the method further comprises:
    the user editing the multimedia message with the transmission terminal and selecting the WIFI to transmit the multimedia message; or selecting an existing multimedia message and forwarding the existing multimedia message via WIFI; wherein the limitation to the size of multimedia messages is cancelled by the transmission terminal.

5. A device for group-transmitting multimedia messages, comprising a hardware processor configured to execute the following modules: a setting module, a multimedia message module, a WIFI connection management module and a multimedia message transmission module; wherein
    the setting module, configured to provide an interface for setting addresses of reception parties to a user and store the set addresses of the reception parties;
    the multimedia message module, configured to notify the WIFI connection management module after the user transmitting an edited multimedia message or an existing multimedia message via Wireless Fidelity (WIFI);
    the WIFI connection management module, configured to read the addresses of the reception parties in the setting module according to the notification from the multimedia message module, establish a connection with the reception terminals according to the addresses of the reception parties and notify the multimedia message transmission module; and
    the multimedia message transmission module, configured to read the multimedia message in the outbox and the addresses of the reception parties in the setting module according to the notification from the WIFI connection management module, and transmit the multimedia message to the reception terminals according to the addresses of the reception parties;

wherein part of the WIFI connection management module which is at the transmission terminal is configured to open the WIFI, search hot spots and establish a connection with the hot spots according to the notification from the multimedia message module; read the stored addresses of the reception parties, notify the reception terminals to open the WIFI and establish a connection with the reception terminals according to the addresses of the reception parties and TCP/IP; and part of the WIFI connection management module which is at the reception terminal is configured to open the WIFI, search hot spots and establish a connection with the hot spots according to the notification from the transmission terminal;

or open the WIFI, search hot spots and establish a connection with the hot spots according to the user's choice.

6. The device as claimed in claim 5, wherein the multimedia message module is further configured to provide a multimedia message editing or forwarding interface to the users and cancel the limitation to the size of multimedia messages.

7. The device as claimed in claim 5, wherein the device further comprises:

a multimedia message reception module, which is at the reception terminal, configured to determine the reception of the multimedia message is finished, notify the multimedia message transmission module of the transmission terminal and the WIFI connection management module at the reception terminal; and part of the WIFI connection management module, which is at the reception terminal, further configured to disconnect the reception terminal from the hot spots according to the notification from the multimedia message reception module.

8. The device as claimed in claim 7, wherein the multimedia message transmission module is further configured to determine the transmission of the multimedia message is finished according to the notification from the reception terminal, prompt the user and notify the WIFI connection management module at the transmission terminal; and part of the WIFI connection management module, which is at the transmission terminal, is configured to disconnect the transmission terminal from the hot spots according to the notification from the multimedia message module.

* * * * *